United States Patent [19]

Yu et al.

[11] Patent Number: 6,047,186
[45] Date of Patent: Apr. 4, 2000

[54] METHOD AND SYSTEM FOR SOLVING CELLULAR COMMUNICATIONS FREQUENCY PLANNING PROBLEM

[75] Inventors: Chang Yu; Xu Han, both of Plano; Seshagiri Rao Madhavapeddy, Richardson; Sairam Subramanian, Dallas, all of Tex.

[73] Assignee: Nortel Networks Corporation, Montreal, Canada

[21] Appl. No.: 08/944,376

[22] Filed: Oct. 6, 1997

[51] Int. Cl.[7] .................................................. H04Q 7/36
[52] U.S. Cl. .......................... 455/446; 455/447; 455/450
[58] Field of Search .................................... 455/447, 450, 455/464, 505, 446, 561, 62, 452, 453, 448, 449, 63

[56] References Cited

U.S. PATENT DOCUMENTS

| | | | |
|---|---|---|---|
| 4,144,411 | 3/1979 | Frenkiel | 455/447 |
| 4,727,590 | 2/1988 | Kawano et al. | 455/446 |
| 5,230,081 | 7/1993 | Yamada et al. | 455/456 |
| 5,649,292 | 7/1997 | Doner | 455/447 |
| 5,838,673 | 11/1998 | Ritz et al. | 370/336 |

*Primary Examiner*—William G. Trost
*Assistant Examiner*—Sonny Trinh
*Attorney, Agent, or Firm*—John D. Crane; Andrew J. Dillon

[57] ABSTRACT

The foregoing objects are achieved as is now described. Provided are a method and system for utilization with wireless communications systems having a cellular architecture covering a geographic area. The method and system accomplish their objects via the following. The geographic area is defined. One or more pairs of the sectors within the defined geographic area wherein a weak connection zone exists are determined. The geographic area is decomposed into two or more sub-areas wherein each sub-area is isolated from other sub-areas by the determined one or more pairs of sectors having a weak connection zone. A first of the sub-areas is selected. Frequency groups are assigned to each sector within the first selected sub-area such that signal to noise ratio is optimized. Thereafter, a second of the sub-areas is selected. One or more sectors within the second selected one of the sub-areas which are linked to sectors within the first selected sub-area are selected. Frequency groups are assigned to the selected sectors within the selected second of the sub-areas such that signal to noise ratio in the selected sector within the selected second of the sub-areas is optimized. Thereafter, frequency groups are assigned to every other sector within the selected second of the sub-areas such that signal to noise ratio is optimized across the second selected sub-area and such that signal to noise ratio over the defined geographic area is optimized.

12 Claims, 13 Drawing Sheets

Cell Cluster of Size 7
Wherein No
Frequencies Are Reused

Hypothetical Example of How Idealized Cell Cluster of Size n=7 Can Be Modified by "Real World" Constraints

| LOC_ID | BEST_CHN | BEST_POWER | ITF_1_CHN | ITF_1_C2I | ... | ITF_5_CHN | ITF_5_C2I |
|---|---|---|---|---|---|---|---|
| 1 | 650 | -35 | 607 | 71 | ... | 403 | 85 |
| 2 | 483 | -69 | 381 | 3 | ... | 481 | 28 |
| 3 | 481 | -59 | 483 | 34 | ... | 439 | 50 |
| ... | ... | ... | ... | ... | ... | ... | ... |

*Fig. 4*

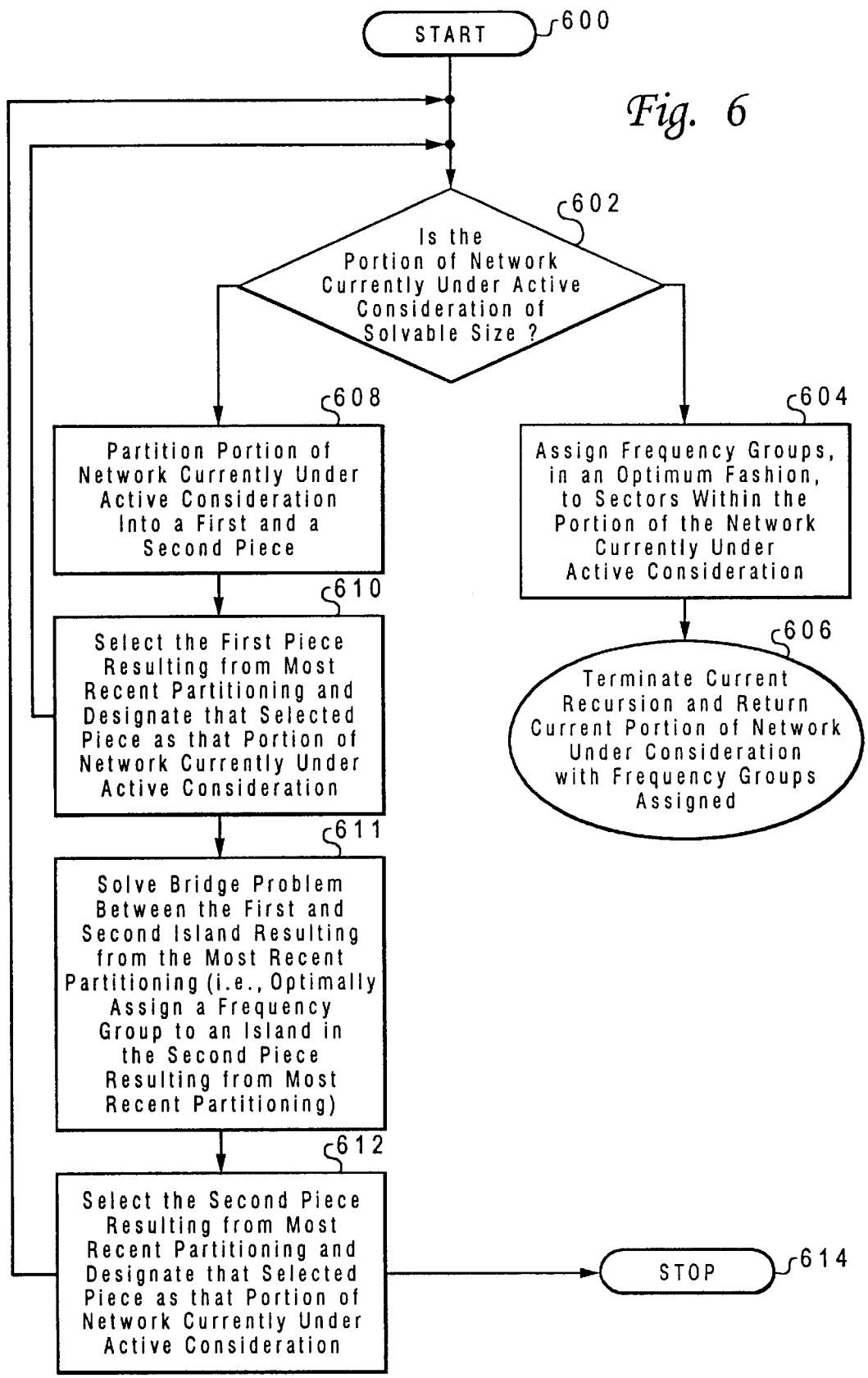

$$\min \quad Z \quad \text{— 700}$$

$$\text{subject to: } Z_{kj} \geq P_{kj} - |X_{i_k} - X_j| d_{kj} \quad j \in J_k, \; k \in K \quad \text{— 702}$$

$$Z_{kj} \geq P_{kj} - (N - X_{i_k} - X_j) d_{kj} \quad j \in J_k, \; k \in K \quad \text{— 704}$$

$$Z_{kj} \geq P_{kj} - (N + X_{i_k} - X_j) d_{kj} \quad j \in J_k, \; k \in K \quad \text{— 706}$$

$$P_{ki_k} Z \geq \sum_{j \in J_k} Z_{kj} \quad k \in K \quad \text{— 708}$$

$$0 \leq X_{i_k}, X_j \leq N - 1 \quad \text{— 710}$$

$$Z_{kj} \geq 0 \quad \text{— 712}$$

$$|X_i - X_j| \geq c \quad \text{if } i, j \text{ are adjacent sectors}$$

Fig. 7

| Channel group | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| | A1 | B1 | C1 | D1 | E1 | F1 | G1 | A2 | B2 | C2 | D2 | E2 | F2 | G2 | A3 | B3 | C3 | D3 | E3 | F3 | G3 |
| | 1 | 2 | 3 | 4 | 5 | 6 | 7 | 8 | 9 | 10 | 11 | 12 | 13 | 14 | 15 | 16 | 17 | 18 | 19 | 20 | 21 |
| | 22 | 23 | 24 | 25 | 26 | 27 | 28 | 29 | 30 | 31 | 32 | 33 | 34 | 35 | 36 | 37 | 38 | 39 | 40 | 41 | 42 |
| | 43 | 44 | 45 | 46 | 47 | 48 | 49 | 50 | 51 | 52 | 53 | 54 | 55 | 56 | 57 | 58 | 59 | 60 | 61 | 62 | 63 |
| | 64 | 65 | 66 | 67 | 68 | 69 | 70 | 71 | 72 | 73 | 74 | 75 | 76 | 77 | 78 | 79 | 80 | 81 | 82 | 83 | 84 |
| | 85 | 86 | 87 | 88 | 89 | 90 | 91 | 92 | 93 | 94 | 95 | 96 | 97 | 98 | 99 | 100 | 101 | 102 | 103 | 104 | 105 |
| | 106 | 107 | 108 | 109 | 110 | 111 | 112 | 113 | 114 | 115 | 116 | 117 | 118 | 119 | 120 | 121 | 122 | 123 | 124 | 125 | 126 |
| | 127 | 128 | 129 | 130 | 131 | 132 | 133 | 134 | 135 | 136 | 137 | 138 | 139 | 140 | 141 | 142 | 143 | 144 | 145 | 146 | 147 |
| | 148 | 149 | 150 | 151 | 152 | 153 | 154 | 155 | 156 | 157 | 158 | 159 | 160 | 161 | 162 | 163 | 164 | 165 | 166 | 167 | 168 |
| | 169 | 170 | 171 | 172 | 173 | 174 | 175 | 176 | 177 | 178 | 179 | 180 | 181 | 182 | 183 | 184 | 185 | 186 | 187 | 188 | 189 |
| | 190 | 191 | 192 | 193 | 194 | 195 | 196 | 197 | 198 | 199 | 200 | 201 | 202 | 203 | 204 | 205 | 206 | 207 | 208 | 209 | 210 |
| | 211 | 212 | 213 | 214 | 215 | 216 | 217 | 218 | 219 | 220 | 221 | 222 | 223 | 224 | 225 | 226 | 227 | 228 | 229 | 230 | 231 |
| | 232 | 233 | 234 | 235 | 236 | 237 | 238 | 239 | 240 | 241 | 242 | 243 | 244 | 245 | 246 | 247 | 248 | 249 | 250 | 251 | 252 |
| | 253 | 254 | 255 | 256 | 257 | 258 | 259 | 260 | 261 | 262 | 263 | 264 | 265 | 266 | 267 | 268 | 269 | 270 | 271 | 272 | 273 |
| | 274 | 275 | 276 | 277 | 278 | 279 | 280 | 281 | 282 | 283 | 284 | 285 | 286 | 287 | 288 | 289 | 290 | 291 | 292 | 293 | 294 |
| | 295 | 296 | 297 | 298 | 299 | 300 | 301 | 302 | 303 | 304 | 305 | 306 | 307 | 308 | 309 | 310 | 311 | 312 | | | |
| | 313 | 314 | 315 | 316 | 317 | 318 | 319 | 320 | 321 | 322 | 323 | 324 | 325 | 326 | 327 | 328 | 329 | 330 | 331 | 332 | 333 |
| | 334 | 335 | 336 | 337 | 338 | 339 | 340 | 341 | 342 | 343 | 344 | 345 | 346 | 347 | 348 | 349 | 350 | 351 | 352 | 353 | 354 |
| | 355 | 356 | 357 | 358 | 359 | 360 | 361 | 362 | 363 | 364 | 365 | 366 | 367 | 368 | 369 | 370 | 371 | 372 | 373 | 374 | 375 |
| | 376 | 377 | 378 | 379 | 380 | 381 | 382 | 383 | 384 | 385 | 386 | 387 | 388 | 389 | 390 | 391 | 392 | 393 | 394 | 395 | 396 |
| | 397 | 398 | 399 | 400 | 401 | 402 | 403 | 404 | 405 | 406 | 407 | 408 | 409 | 410 | 411 | 412 | 413 | 414 | 415 | 416 | 417 |
| | 418 | 419 | 420 | 421 | 422 | 423 | 424 | 425 | 426 | 427 | 428 | 429 | 430 | 431 | 432 | 433 | 434 | 435 | 436 | 437 | 438 |
| | 439 | 440 | 441 | 442 | 443 | 444 | 445 | 446 | 447 | 448 | 449 | 450 | 451 | 452 | 453 | 454 | 455 | 456 | 457 | 458 | 459 |
| | 460 | 461 | 462 | 463 | 464 | 465 | 466 | 467 | 468 | 469 | 470 | 471 | 472 | 473 | 474 | 475 | 476 | 477 | 478 | 479 | 480 |
| | 481 | 482 | 483 | 484 | 485 | 486 | 487 | 488 | 489 | 490 | 491 | 492 | 493 | 494 | 495 | 496 | 497 | 498 | 499 | 500 | 501 |
| | 502 | 503 | 504 | 505 | 506 | 507 | 508 | 509 | 510 | 511 | 512 | 513 | 514 | 515 | 516 | 517 | 518 | 519 | 520 | 521 | 522 |
| | 523 | 524 | 525 | 526 | 527 | 528 | 529 | 530 | 531 | 532 | 533 | 534 | 535 | 536 | 537 | 538 | 539 | 540 | 541 | 542 | 543 |
| | 544 | 545 | 546 | 547 | 548 | 549 | 550 | 551 | 552 | 553 | 554 | 555 | 556 | 557 | 558 | 559 | 560 | 561 | 562 | 563 | 564 |
| | 565 | 566 | 567 | 568 | 569 | 570 | 571 | 572 | 573 | 574 | 575 | 576 | 577 | 578 | 579 | 580 | 581 | 582 | 583 | 584 | 585 |
| | 586 | 587 | 588 | 589 | 590 | 591 | 592 | 593 | 594 | 595 | 596 | 597 | 598 | 599 | 600 | 601 | 602 | 603 | 604 | 605 | 606 |
| | 607 | 608 | 609 | 610 | 611 | 612 | 613 | 614 | 615 | 616 | 617 | 618 | 619 | 620 | 621 | 622 | 623 | 624 | 625 | 626 | 627 |
| | 628 | 629 | 630 | 631 | 632 | 633 | 634 | 635 | 636 | 637 | 638 | 639 | 640 | 641 | 642 | 643 | 644 | 645 | 646 | 647 | 648 |
| | 649 | 650 | 651 | 652 | 653 | 654 | 655 | 656 | 657 | 658 | 659 | 660 | 661 | 662 | 663 | 664 | 665 | 666 | | | |
| | 667 | 668 | 669 | 670 | 671 | 672 | 673 | 674 | 675 | 676 | 677 | 678 | 679 | 680 | 681 | 682 | 683 | 684 | 685 | 686 | 687 |
| | 688 | 689 | 690 | 691 | 692 | 693 | 694 | 695 | 696 | 697 | 698 | 699 | 700 | 701 | 702 | 703 | 704 | 705 | 706 | 707 | 708 |
| | 709 | 710 | 711 | 712 | 713 | 714 | 715 | 716 | 717 | 718 | 719 | 720 | 721 | 722 | 723 | 724 | 725 | 726 | 727 | 728 | 729 |
| | 730 | 731 | 732 | 733 | 734 | 735 | 736 | 737 | 738 | 739 | 740 | 741 | 742 | 743 | 744 | 745 | 746 | 747 | 748 | 749 | 750 |
| | 751 | 752 | 753 | 754 | 755 | 756 | 757 | 758 | 759 | 760 | 761 | 762 | 763 | 764 | 765 | 766 | 767 | 768 | 769 | 770 | 771 |
| | 772 | 773 | 774 | 775 | 776 | 777 | 778 | 779 | 780 | 781 | 782 | 783 | 784 | 785 | 786 | 787 | 788 | 789 | 790 | 791 | 792 |

Fig. 8

METHOD AND SYSTEM FOR SOLVING CELLULAR COMMUNICATIONS FREQUENCY PLANNING PROBLEM

BACKGROUND OF THE INVENTION

1. Technical Field

The present invention relates, in general, to an improved method and system to be utilized with wireless communication systems having cellular architectures. In particular, the present invention relates to an improved method and system, to be utilized with wireless communication systems having cellular architectures, and which assigns groups of channels to individual cells within the system in such a fashion that system-wide signal to noise ratio is maximized over some defined geographical area.

2. Description of the Related Art

The present invention is related to wireless communication systems, and, in particular, to wireless communication systems having a cellular architecture (e.g., cellular telephony, Personal Communication Systems, or Global System for Mobil Communication). Wireless communication refers to the fact that transmission between sending and receiving stations occurs via electromagnetic radiation not guided by any hard physical path (e.g., by microwave link.) Cellular architecture refers to the fact that the wireless system effects service over an area by utilizing a system that can be pictographically represented as a cellular grid.

Wireless cellular communication is the latest incarnation of a technology that was originally known as mobile telephone systems. Early mobile telephone system architecture was structured similar to television broadcasting. That is, one very powerful transmitter located at the highest spot in an area would broadcast in a very large radius. If a user were in the useable radius, then that user could broadcast to the base station and communicate by radiotelephone to the base station. However, such systems proved to be very expensive for the users and not very profitable to the communication companies supplying such services. The primary limiting factor of the original mobile telephone systems was that the number of channels available for use was limited due to severe channel-to-channel interference within the area served by the powerful transmitter. Thus, a problem arose as to how to provide more channels within the service area.

Counterintuitively, engineers discovered that channel-to-channel interference effects within the service area were not due solely to the distance between stations communicating with the base transmitter (which intuitively would seem to give rise to the interference,) but were also inversely related to the transmitter power (radius) of the area being served by the transmitter. Engineers found that by reducing the radius of an area by fifty percent, service providers could increase the number of potential customers in an area fourfold. It was found that systems based on areas with a one-kilometer radius would have one hundred times more channels than systems with areas with a ten-kilometers in radius. Speculation led to the conclusion that by reducing the radius of areas to a few hundred meters, the number of calls that could be served by each cell could be greatly increased.

Thus, reducing the power of the central transmitter allowed a significant increase in the number of available channels by reducing channel-to-channel interference within an area. However, as the power of the central transmitter was reduced, the serviceable area was also reduced. Thus, although reducing transmission power increased the number of available channels, the small service area provided by such reduced power did not make such radio telephone systems attractive communication options for many users. Thus, a problem arose relating to how to utilize the discovery that smaller cell sizes increased available channels in a fashion that would provide service attractive to users.

This problem was solved by the invention of the wireless cellular architecture concept. The wireless cellular architecture concept utilizes geographical subunits called "cells" and is buttressed by what is known as a frequency reuse concept. A cell is the basic geographic unit of a cellular system. Cells are base stations (a base station consists of hardware located at the defining location of a cell and includes power sources, interface equipment, radio frequency transmitters and receivers, and antenna systems) transmitting over small geographic areas that are represented as hexagons. Each cell size varies depending on the landscape. The term "cellular" comes from the honeycomb shape of the areas into which a coverage region is divided. Because of constraints imposed by natural terrain and man-made structures, the true shape of cells is not a perfect hexagon, but such shape serves as an effective tool for design engineering.

Within each cell a base station controller talks to many mobile subscriber units at once, utilizing one defined transmit/receive communications channel per mobile subscriber unit. A mobile subscriber unit (a control unit and a transceiver that transmits and receives wireless transmissions to and from a cell site) uses a separate, temporary wireless channel to talk to a cell site. Transmit/receive communication channels utilize a pair of frequencies for communication—one for transmitting from the cell site base station controller, named the forward link, and one frequency for the cell site to receive calls from the users, named the reverse link. Both the forward and reverse link must have sufficient bandwidth to allow transmission of user data.

The frequency reuse concept is what made wireless cellular communications a viable reality. Wireless communication is regulated by government bodies (e.g., the Federal Communications Commission.) Government bodies dictate what frequencies in the wireless spectrum can be utilized for particular applications. Consequently, there is a finite set of frequencies available for use with cellular communications. The frequency reuse concept is based on assigning to each cell a group of radio channels used within a small geographic area (cell). Adjacent cells are assigned a group of channels that is completely different from any neighboring cell. Thus, in the frequency reuse concept there are always buffer cells between two cells utilizing the same set of frequencies. The cells are sized such that it is not likely that two cells utilizing the same set of frequencies will interfere with each other. Thus, such a scheme allows "frequency reuse" by non-adjacent cells.

Since each contiguous cell utilizes different frequencies, the ability for such a system to supply continuous service across a cell grid requires that a call-in-progress be switched to a new transmit/receive channel as a user transits from one cell into another. That is, since adjacent areas do not use the same wireless channels, a call must either be dropped or transferred from one wireless channel to another when a user crosses the line between adjacent cells. Because dropping the call is unacceptable, the process of "handoff" was created. Handoff occurs when the mobile telephone network automatically transfers a call from wireless channel to wireless channel as a mobile subscriber unit crosses adjacent cells.

Handoff works as follows. During a call, a moving mobile subscriber unit is utilizing one voice channel. When the mobile unit moves out of the coverage area of a given cell site, the reception becomes weak. At this point, the base station controller in use requests a handoff. The system switches the call to another different frequency channel in a new cell without interrupting the call or alerting the user. The call continues as long as the user is talking, and generally the user barely notices the handoff.

The foregoing ideas of cells, frequency reuse, and handoff constituted the invention of the cellular concept. The invention of the cellular concept made the idea of wireless cellular communications a viable commercial reality.

As noted previously, the frequency reuse concept requires assigning groups of cells different groups of frequencies. In practice, in order to do the assignment engineers first assume an ideal hexagon layout of the network and apply an ideal frequency assignment pattern "as if" the distribution of the electromagnetic energy being transmitted to achieve communication perfectly matched the hexagonal shapes.

The frequency assignment method is typically done on some variation of a graph coloring approach. In this approach, the assignment problem is formulated as a graph coloring problem where groups of channels are assigned colors and consequently each hexagon is colored such that no hexagons of the same color touch, which is a way to assure that a "buffer zone" exists between any two cells utilizing the same group of channels. In addition, there have been attempts to train neural networks to mimic what human engineers do by experience and intuition.

FIG. 1 illustrates how the frequency assignment problem is typically solved. In FIG. 1 there is depicted a cell cluster within a wireless communication system having a cellular architecture within which the method and system of the present invention may be implemented. Recall that in the above discussion it was noted that frequency reuse is a concept that has been utilized to allow cellular communications over a large area. It is common to create a cell cluster composed of idealized hexagonal cells, as is shown in FIG. 1, whereby the frequency reuse concept is implemented. A cell cluster is a group of cells. Typically, no channels are reused within a cluster. FIG. 1 illustrates seven-cell cluster 100.

A "cell" is the basic geographic unit of a cellular system. The term "cellular" comes from the honeycomb shape of the areas into which a coverage region is divided. In FIG. 1 each cell 101, 102, 103, 104, 105, 106, and 107 is depicted as a honeycomb shape within which base stations 111, 112, 113, 114, 115, 116 and 117, respectively, are shown. Cells are pictographic representations of the effective geographic area of base station (a base station includes but is not limited to transmitters and receivers sufficient to service existing cell channels within a particular cell) transmitters that are for convenience represented as hexagons. Each cell size varies depending on the landscape. Because of constraints imposed by natural terrain and man-made structures, the true shape of cells is not a perfect hexagon.

Since seven-cell cluster 100 utilizes the frequency reuse concept, each cell in FIG. 1 utilizes a set of channels wherein each channel is based upon a set of carrier frequencies different from those utilized by any other cell 101, 102, 103, 104, 105, 106, 107 within seven-cell cluster 100. Thus, if available frequencies are divided evenly, each cell 101, 102, 103, 104, 105, 106, and 107 will utilize 1/7 of frequencies available for utilization.

Unfortunately, the electromagnetic energy very rarely matches the perfectly arranged hexagonal shapes shown. Variations in terrain and buildings often disrupt the transmitted electromagnetic energy. Consequently, after such a hexagonal has been laid out and groups of frequencies assigned, it is generally found that both the hexagonal model and the frequency assignment are grossly inadequate. Thus, subsequent to the hexagonal modeling and subsequent group of channels assignment, it is typical that a long period of "trial and error" is engaged in where engineers actually go out and empirically determine the true distribution of the individual cells (which often are radically different in shape than the idealized hexagons). FIG. 2 gives a pictorial hypothetical representation of how the idealized hexagons of FIG. 1 might ultimately be "adjusted" to become "real world" cells 201, 202, 203, 204, 205, 206, and 207. Then, after the shape has been adequately determined, the engineers measure the interference in the cells utilizing different channel group assignments and subsequently assign groups of channels based upon the empirical data.

In sum, then, it can be said that generally the frequency assignment problem is typically solved via six steps: (1) an idealized hexagonal distribution of electromagnetic energy within cells is assumed; (2) frequency assignment is done, utilizing any one of a number of approaches, based on the assumed idealized hexagonal distribution; (3) the frequency assignment based on the idealized distribution is implemented in true, physical equipment; (4) physical measurements are taken regarding the true, physical, shape of the cell and physical measurements are taken regarding the true interference measured within each cell; (5) the frequency assignment is adjusted based upon the physical measurements; and (6) thereafter, steps (4) and (5) are iteratively engaged in until engineers determine that satisfactory system performance is achieved.

Deficiencies exist in the typical solutions to the frequency assignment problem in that the re-engineering (i.e., "trial and error") involved in modifying the idealized solution to the frequency assignment problem such that it works in an actual physical system is generally very labor intensive and time consuming. Furthermore, in general, the more diverse the terrain and surrounding building structures are, the more labor intensive the re-engineering effort, in that such diversity often makes the true cells radically different from the assumed perfectly hexagonal shape.

In light of the foregoing, it is apparent that a need exists for a method and system which will provide a solution to the frequency assignment problem which is much more correspondent to real world systems, and thus greatly decrease or eliminate the amount of re-engineering effort required to implement such a solution in true, physical systems.

SUMMARY OF THE INVENTION

It is therefore one object of the present invention to provide an improved method and system to be utilized with wireless communication systems having cellular architectures.

It is yet another object of the present invention to provide an improved method and system, to be utilized with wireless communication systems having cellular architectures, and which provide a solution to the frequency assignment problem which is much more correspondent to real world systems, and thus greatly decrease or eliminate the amount of re-engineering effort required to implement such a solution in true, physical systems.

The foregoing objects are achieved as is now described. Provided are a method and system for utilization with wireless communications systems having a cellular architecture covering a geographic area, and wherein the geographic area is populated by a plurality of cells and wherein each of the plurality of cells is subdivided into sectors, and wherein the wireless communications system has a plurality of groups of channels, and wherein the method and system assign specific groups of channels drawn from the plurality of groups of channels to each sector such that signal to noise ratio over the geographic area is optimized. The method and system accomplish their objects via the following. The geographic area is defined. One or more pairs of the sectors within the defined geographic area wherein a weak connection zone exists are determined. The defined geographic area is decomposed into two or more sub-areas composed of one or more of the sectors and wherein each sub-area is isolated from other sub-areas by the determined one or more pairs of sectors having a weak connection zone. A first of the sub-areas is selected. Frequency groups are assigned to each sector within the first selected sub-area such that signal to noise ratio is optimized across the first selected sub-area. Thereafter, a second of the sub-areas is selected. One or more sectors within the second selected one of the sub-areas which are linked to sectors within the first selected sub-area are selected. Frequency groups are assigned to the selected sectors within the selected second of the sub-areas such that signal to noise ratio in the selected sector within the selected second of the sub-areas is optimized. Thereafter, frequency groups are assigned to every other sector within the selected second of the sub-areas such that signal to noise ratio is optimized across the second selected sub-area and such that signal to noise ratio over the defined geographic area is optimized. Furthermore, an available group is assigned to a particular one of the sectors, with such group drawn from the plurality of groups of channels. An aggregate interference in the particular one of the sectors arising from active groups of channels other than the group assigned to the particular one of the sectors is determined. A signal to noise ratio drawn upon a signal strength of the group of channels assigned to the particular one of the sectors and the determined aggregate interference is calculated. Thereafter, the assigning, determining, and calculating steps are engaged in until all available groups of channels have been assigned to the particular one of the sectors and the determining and calculating steps have been engaged in for all the available groups. And, that group having the best calculated signal to noise ratio is selected for permanent assignment to the particular one of the sectors.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of utilization, further objects and advantages thereof, will best be understood by reference to the following detailed description of an illustrative embodiment when read in conjunction with the accompanying drawings, wherein:

FIG. 4 depicts an example of a data set that can be generated out of the data logged during the drive test depicted in FIG. 3;

FIG. 6 is a high-level logic flowchart that illustrates a recursive method by which the foregoing operations described in relation to FIG. 5 can be achieved;

FIG. 7 depicts a newly-created set of criteria to be utilized with a newly-created method whereby a frequency group can be optimally assigned to a sector under consideration;

FIG. 8 sets forth a table where the foregoing described assumptions related to the numbering of frequency groups are illustrated, and where the first channel group is denoted channel group 0 and the last channel group is denoted 20;

DETAILED DESCRIPTION OF ILLUSTRATIVE EMBODIMENT

Figure 1:
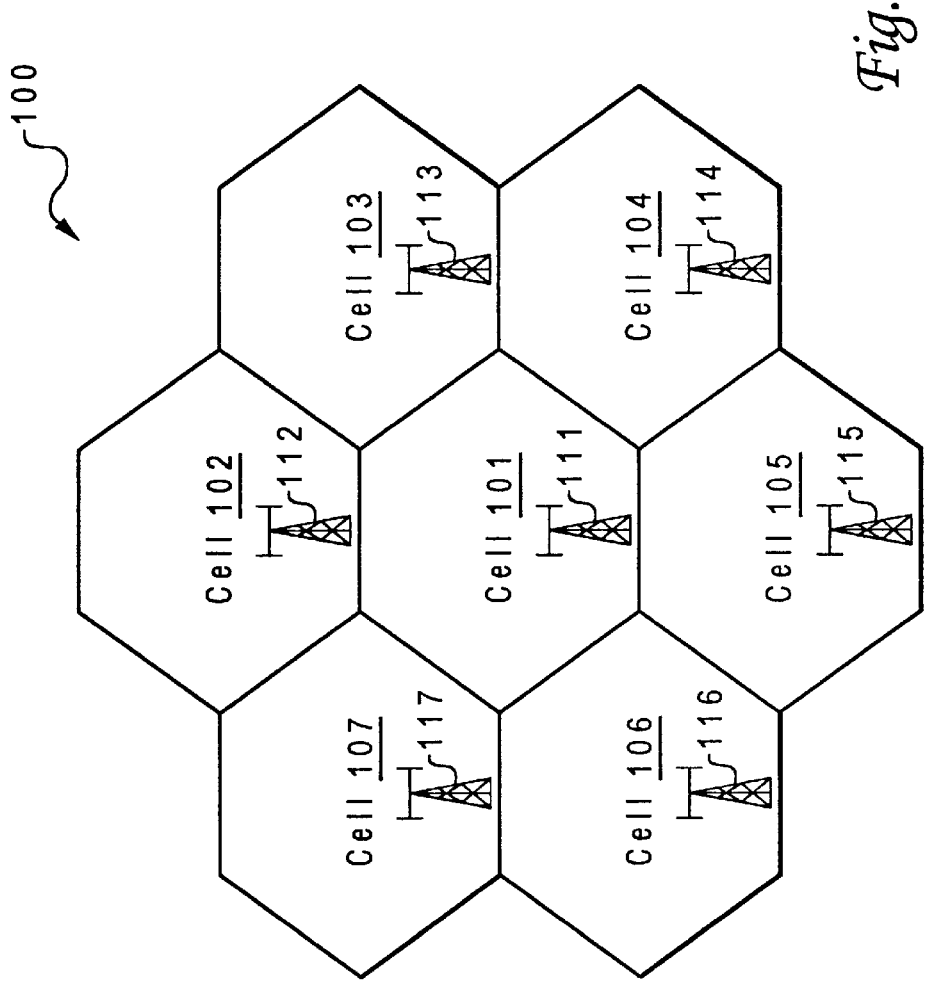
FIG. 1 depicts a cell cluster within a wireless communication system having a cellular architecture within which the method and system of the present invention may be implemented.
Figure 2:
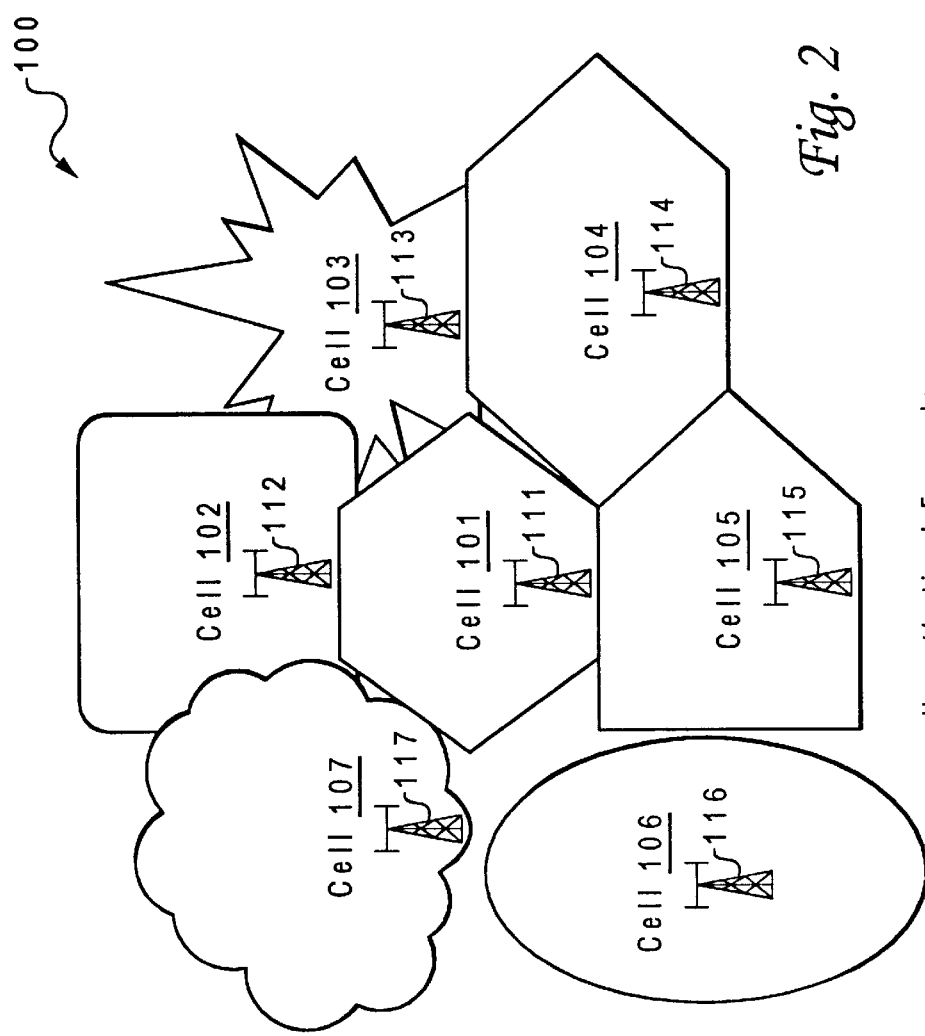
FIG. 2 gives a pictorial hypothetical representation of how the idealized hexagons of FIG. 1 might ultimately be "adjusted" to become "real world" cells 201, 202, 203, 204, 205, 206, and 207.

The present invention represents a radical departure from previous methods and systems providing solutions to the frequency assignment problem. As was mentioned above, typical solutions to the problem generally teach an assumption of an idealized hexagonal distribution of cells, assign frequencies based upon such idealized distribution, implement the idealized distribution in a true physical system, and then iteratively adjust the idealized distribution until adequate performance is achieved.

The present invention represents a radical departure from the typical solutions in that it completely inverts the normal order of solution. In the present invention, the starting point is measured data from a true physical system (or, equivalently, data derived from a computer simulation of the true physical system). Subsequently, such measured or derived data is utilized to posit sectors (which typically equate to subdivisions of the more traditional cells) within the geographic area covered by the system. Thereafter, the posited sectors are utilized in conjunction the measured or derived data to decompose the problem of frequency assignment within the system into smaller subproblems wherein frequency assignment can be optimized. Each subproblem (or "island" or "region") is composed of one or more of the posited sectors.

Once the smaller subproblems have been achieved, optimum frequency assignment is obtained for a first of the smaller subproblems. The optimum frequency assignment is achieved utilizing an innovative optimization routine which seeks to optimize the received signal strength power to interference power within each sector composing the subproblem being solved.

Subsequent to a subproblem being solved, adjacent sectors in another subproblem (or "island" or "region") are selected, and channel groups are assigned to those sectors where such assignments maximize the received signal strength power to interference power within such sectors given the previous assignment of channels in the subproblem solved previously.

Subsequent to an assignment of a channel group to the sector, channel assignment within the subproblem (or "island" or "region") of which the sector is a member is optimized. The optimum frequency assignment is achieved utilizing an innovative optimization routine which seeks to optimize the received signal strength power to interference power within each sector composing the subproblem being solved.

The solution of this second subproblem utilizes as a starting point the frequency group assigned to a sector in the second subproblem. However, other than the foregoing the solution is achieved "as if" the second subproblem stands alone (i.e., other than utilizing the frequency group assigned to the sector in the second subproblem, the solution of the previous subproblem is not taken into account). The ability to solve the second problem "as if" it stands alone arises from the fact that the way in which the subproblems are defined is done such that each subproblems is separated by others by a "weak connection zone," and thus each subproblem can be treated as a stand alone "island" or "region" of communication activity.

Subsequent to the second subproblem being solved, adjacent sectors in another unsolved subproblem (or "island" or "region") are selected, and channel groups are assigned to those sectors where such assignments maximize the received signal strength power to interference power within such sectors given the previous assignment of channels in the second subproblem solved previously. Thereafter, the frequency assignment process proceeds in the fashion described for the second subproblem described previously. Thereafter, the process proceeds as has been described until all subproblems have been solved.

Since each subproblem essentially constitutes an island independent of other islands in the network, and since the frequency group assignments within each subproblem have been optimized, this solution optimizes the frequency assignment for the network as a whole. Furthermore, since the assignment has been achieved on the basis of data measured or derived from the true physical system, the solution will prove optimal for the real world system and thus the re-engineering effort associated with previous solutions is minimized.

The following description will now give a detailed explanation of how the foregoing is achieved.

Step One: Defining Sectors Within True Physical Network

It was mentioned above that in typical solutions to the frequency assignment problem, a hexagon distribution of electromagnetic energy is assumed. Such is not the case in the present invention. In the present invention, the starting point is to determine each true physical cell, and subsequently to define actual physical sectors within each true physical cell.

The contour of each true physical cell is determined by measurement, and is generally the useable coverage area of a particular base station (or transmission system). The contour of each sector is a subdivision of each cell and is also determined by measurement. It is possible for a cell to be composed of only one sector (e.g., an omni-cell). However, it is more typical for cells to be composed of two or more sectors.

Sectors are generally associated with the number, direction, and positioning of each antenna within each cell. For example, it is common for a cell to contain a base station with three directional antennas, arranged such that each cell carves out a coverage area. The useable coverage areas defined by each antenna are termed sectors, and thus each cell (the totality of the area covered by the transmission system of the base station) is generally further subdivided into sectors.

Step Two: Gathering the Data Related to the Sectors With the True, Physical, System As has been discussed, the present invention is based upon data related to a true, physical system. Two of the ways such information can be obtained are by actually measuring data related to a true, physical system or by simulating the true, physical, system on a computer.

Figure 3:
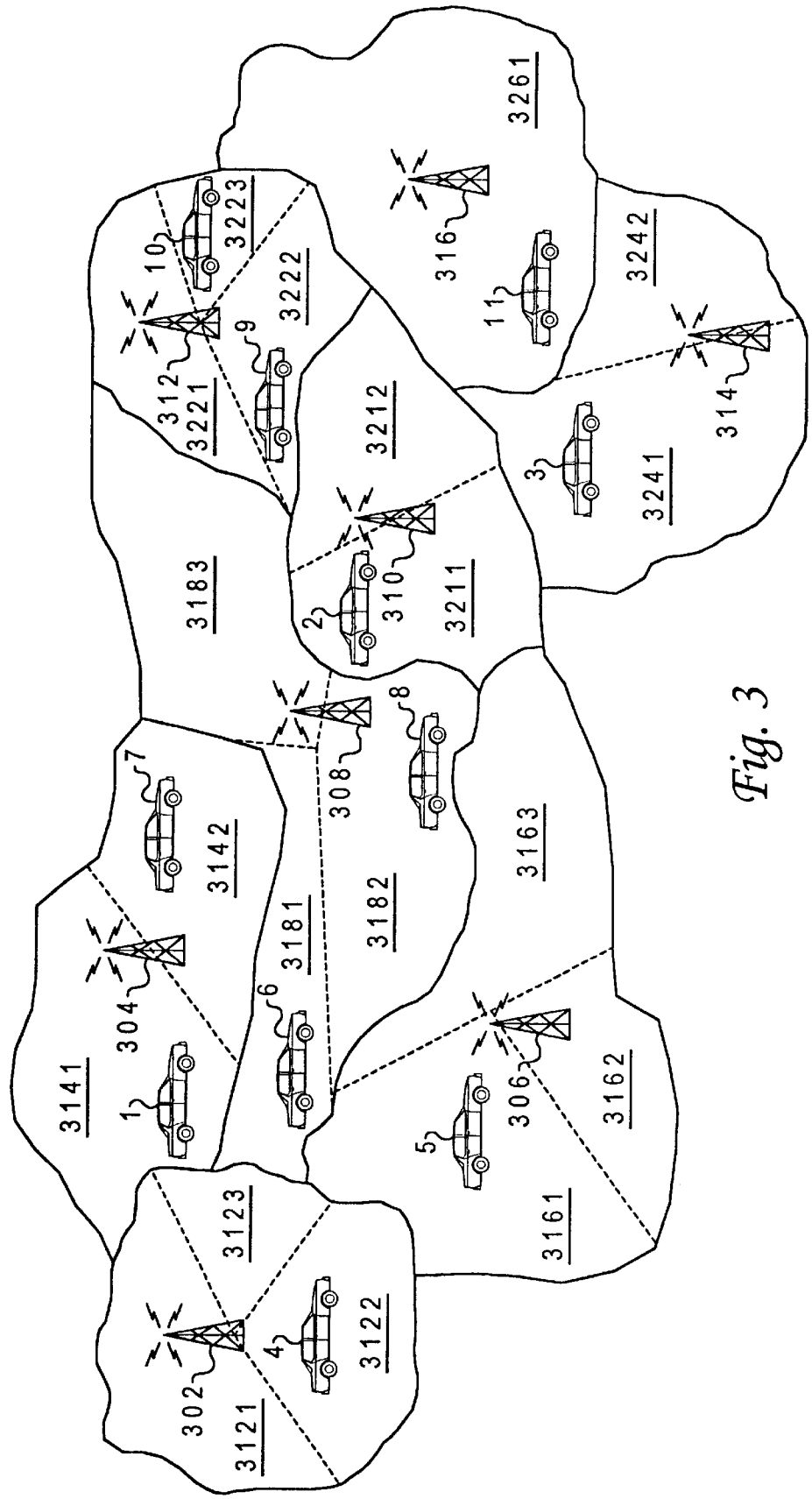
FIG. 3 illustrates eight transmission systems, cells, sectors, and drive test points.

FIG. 3 illustrates how such data could be obtained by measurement. Obtaining such data is generally obtained via what are known as "drive tests," a term which means that an individual actually gets in a car and drives around an area and keeps a log of received signal strength in that area. Shown in FIG. 3 are eight transmission systems: transmission system 302, transmission system 304, transmission system 306, transmission system 308, transmission system 310, transmission system 312, transmission system 314, and transmission system 316. It is intended that the transmission systems shown are to represent true physical transmission systems dispersed over some geographic area. Also shown are illustrations of how actual cells 312, 314, 316, 318, 320, 322, and 324, denoted by the solid line cell boundaries, as such cells might appear in a physical environment having terrain differences and obstructions. In addition, shown illustrations of how actual sectors 3121, 3122, 3123, 3141, 3142, 3161, 3162, 3163, 3181, 3182, 3183, 3211, 3212, 3221, 3222, 3223, 3241, 3242, and 3261 (an omni-cell), denoted by the dashed lines in conjunction with the solid line cell boundaries, might appear within of each actual cell.

When a drive test is performed each transmission system shown is assigned to transmit on a particular frequency or group of frequencies. The drive test is composed of a driver traveling to a number of discrete points and recording each received signal strength at that point. The car-like symbols depicted in FIG. 3 are intended to illustrate location identification points 1, 2, 3, 4, 5, 6, 7, 8, 9, 10, and 11 where a driver performing a drive test stop and took measurements. Since the entire area covered by the system is subdivided into sectors, each measurement point is associated with a sector.

When doing drive test measurements it has been helpful to pick some of the measurement points to be at the boundaries of sectors, which are assumed to be potential places for bad interference. It has also been found helpful to pick some of the measurement points at hot spots where heavy traffic is expected (e.g., a stadium, a mall) since such areas require good coverage and the potential for interference is high due to the heavy traffic.

FIG. 4 depicts an example of a data set that can be generated out of the data logged during the drive test depicted in FIG. 3. The first column (LOC_ID) shown in the table corresponds to the identification points shown in FIG. 3. The second column (BEST_CHN) represents the transmission station transmitting on its assigned channel which gave the absolute highest received signal strength at the identification point. The third column (BEST_POWER) represents the actual power (dBm) of the BEST_CHN received at the geographic location associated with the LOC_ID. The fourth column (ITF_1_CHN) represents the transmission station transmitting on its assigned frequency which gave the next-lowest received signal strength, relative to BEST_CHN, at the geographic location associated with LOC_ID. The fifth column (ITF_1_C2I) represents the calculated channel to interference strength based on BEST_CHN; this quantity is derived from the signal strength for ITF_1_CHN measured at the geographic location associated with the LOC_ID and is obtained via the following equation: ITF_1_C2I=(BEST_CHN Received Signal Strength at LOC_ID)/(ITF_1_CHN Received Signal Strength at LOC_ID). Thus, the C/I (or C2I as it is shown in the table) for ITF_1_CHN indicates that at LOC_ID the received signal strength was −106 dBm (i.e., ITF_1_CHN Received Signal Strength at LOC_ID=(BEST_CHN Received Signal Strength at LOC_ID)−ITF_1_C2I, or ITF_1_CHN Received Signal Strength at LOC_ID=−35− 71=−106 dBm). The remaining quantities in the row associated with LOC_ID are obtained accordingly.

It will be noted that the table shown indicates only 1 best channel and 5 interfering channels are measured, while there are eight transmission stations shown. Those skilled in the art will appreciate that the reason for such is that there will typically be some lowest-level threshold for interference below which any received signals will not be recorded, or because a hardware limit exists on the number of signals that can be recorded by the measuring device. That is, the interference must necessarily be of a magnitude that warrants attention before it is taken into account as interference that needs attention.

The rest of the row entries shown are the measured and calculated quantities for different location identification points (LOC_ID), and the columns are obtained for that LOC_ID as described previously in relation to LOC_ID 1.

System measurements from base stations can also be used to construct such signal level data since BTS (base station transceiver subsystems) usually get signal strength reports from each mobile during a transmission.

In a case where actual drive test data is not available, those skilled in the art will appreciate that computer simulations can be utilized to simulate drive tests. Those skilled in the art will appreciate that simulation models exist which can model actual antenna patterns, orientation, down tilt, terrain height, clutter information, etc. Thus, such simulation can be utilized to effectively model a true, physical, system covering a geographic region and a drive test through such region covered by such system. One example of such simulation could be achieved by using PlaNET data (PlaNET is a registered trademark of Mobile Systems International, Inc). With respect to how to pick the points necessary to simulate the location identification of the actual drive test points just described. Such computer simulations can then be utilized to generate tables analogous to that shown in FIG. 4.

Step Three: Partition the Network into "Islands" of Network Separated by Weak Connection Zones (i.e., Zones of Weak Communication Between Two or More Parts of the Network) by Utilizing the Gathered Data Related to Sectors Within the True, Physical, System, and Thereafter Optimally Assign Frequency Groups to Sector Within Each Island Until Every Sector in the Entire Network has an Assigned Frequency In this step, if it is determined that the network is too large to be solved in one pass (e.g., the number of sectors in the network is too large for the frequency assignment problem to be practicable solved), the network is partitioned into "islands" of Network separated by weak connection zones. Examples of factors that could make a connection zone weak are places in the network where there are fewer numbers of cells or the distance between cells is relatively large. The network is partitioned as follows.

First, the gathered data related to the sectors within the true, physical, system, is utilized to define an "interference weight" between any two sectors i and j which is given by the following equation:

$$w(i,j) = \max(C - a(i,j), 0)$$

where a(i,j)=minimum (C/I values among each pair of sectors having a transmitter associated with sector i as the best transmitter (e.g., where sector i associated with the transmitter listed in the BEST_CHN column of FIG. 4) and a transmitter associated with sector j as the interfering transmitter); that is, a(i,j) can be interpreted as the "worst communication link" that is achieved within the sectors of the system where the transmitter associated with sector i is the channel of choice. In addition, "C" in the equation is intended to indicate some constant. It has been found that good results are generally obtained when the constant is set to be some number greater than or equal to thirty; that is, with $C \geq 30$.

The quantity a(i,j) can be obtained by searching each row in a table such as that shown in FIG. 4 and selecting the interfering transmitter associated with the sector having the smallest C2I.

Once a(i,j) quantities have been found for every sector in the network where a(i,j) is can be defined, the w(i,j) quantities are calculated. The w(i,j) quantity is referred to as the "interference weight," and from the equation for w(i,j) it can be seen that the equation for w(i,j) yields a highest "interference factor" for situations where a(i,j) is lowest. In addition, for those sectors i and j where a(i,j) is not defined, w(i,j)=0 since this means there is no potential interference between the two sectors.

After all the w(i,j) quantities have been determined, the w(i,j) quantities can be utilized to partition the network. The network is partitioned as follows. First a centroid-like point (meaning either that a centroid approximating point is selected or chosen within each sector, or that a centroid point is actually calculated) is selected within each defined sector and thereafter associated with the sector from which the centroid-like point was selected. Second, these points are then graphed, in scale to the actual physical distances separating the centroid-like points in the geographical region covered by the network. Third, for every pair of centroid-like points for which a w(i,j) is defined and is not zero, an arc is drawn joining the points and the arc drawn labeled with the w(i,j) corresponding to the sectors i,j associated with the centroid-like points on either end of the arc.

Fourth, two centroid-like points, denoted i*, j* are selected from the graph which can be connected by following a continuous series of arcs which have been previously drawn on the graph, and which are separated by the greatest geographical distance as is traced out when the series of arc connecting the centroid-like points is followed.

Fifth, the problem is treated "as if" it were a maximum flow problem, utilizing the centroid-like point i* as the source node and centroid-like point j* as the destination node in the maximum flow problem. Sixth, utilize the standard (that is, well known in the art) algorithm for solving the maximum flow problem to solve the problem. This standard algorithm is generally known within the art as the labeling algorithm.

Sixth, when the labeling algorithm terminates with a maximum flow, it is a feature of the algorithm to also partition the graph into two parts. The partition is such that the sum of all the arcs spanning the partition is the minimum for all possible partitions of the network where i* and j* are in two different partitions. This property, or feature, of the labeling algorithm is known in the art as the max-flow-min-cut property. It is this partition which defines the aforementioned "weak connection zone."

Seventh, recalling that the arcs in the network were given the values of the "interference weights" w(i,j), the partition between the two parts can be interpreted to mean that the partition represents the location or locations where the potential interference between the two parts of the network is minimized. Consequently, the network has now been effectively partitioned into two "islands" separated by weak connection zones, which will allow the frequency assignment problem to be solved in each "island" (or allow the solution of each subproblem) virtually independent from the other "island."

Once the network has been so partitioned, one of the two resultant "islands" is selected and it is determined whether that selected "island" is small enough to be solved. There are a number of criteria that could be used to make such an assessment, but one that has been found to be particularly useful has been to set an upper limit on the number of centroid-like points (or nodes, in graph terminology) that can be solved in any particular subproblem or "island." In the event that the selected "island" is too large for solution, such an "island" is treated as a network and is itself subjected to the partitioning steps set forth above; that is, the partitioning method is recursively applied to the smaller subproblem that has just been selected.

The recursive application of the partitioning method to the selected "island," or subproblem results in two new "sub-islands" or sub-subproblems. At this point, one of the two resultant "sub-islands" is selected and examined. If the resultant "sub-island" is itself too large to be solved, the partitioning method is again recursively applied to too large "sub-island," which will result in two "sub-sub-islands." However, at some point it will be determined that an island is solvable, at which point the process begins backing out of the recursion.

Figure 5A:
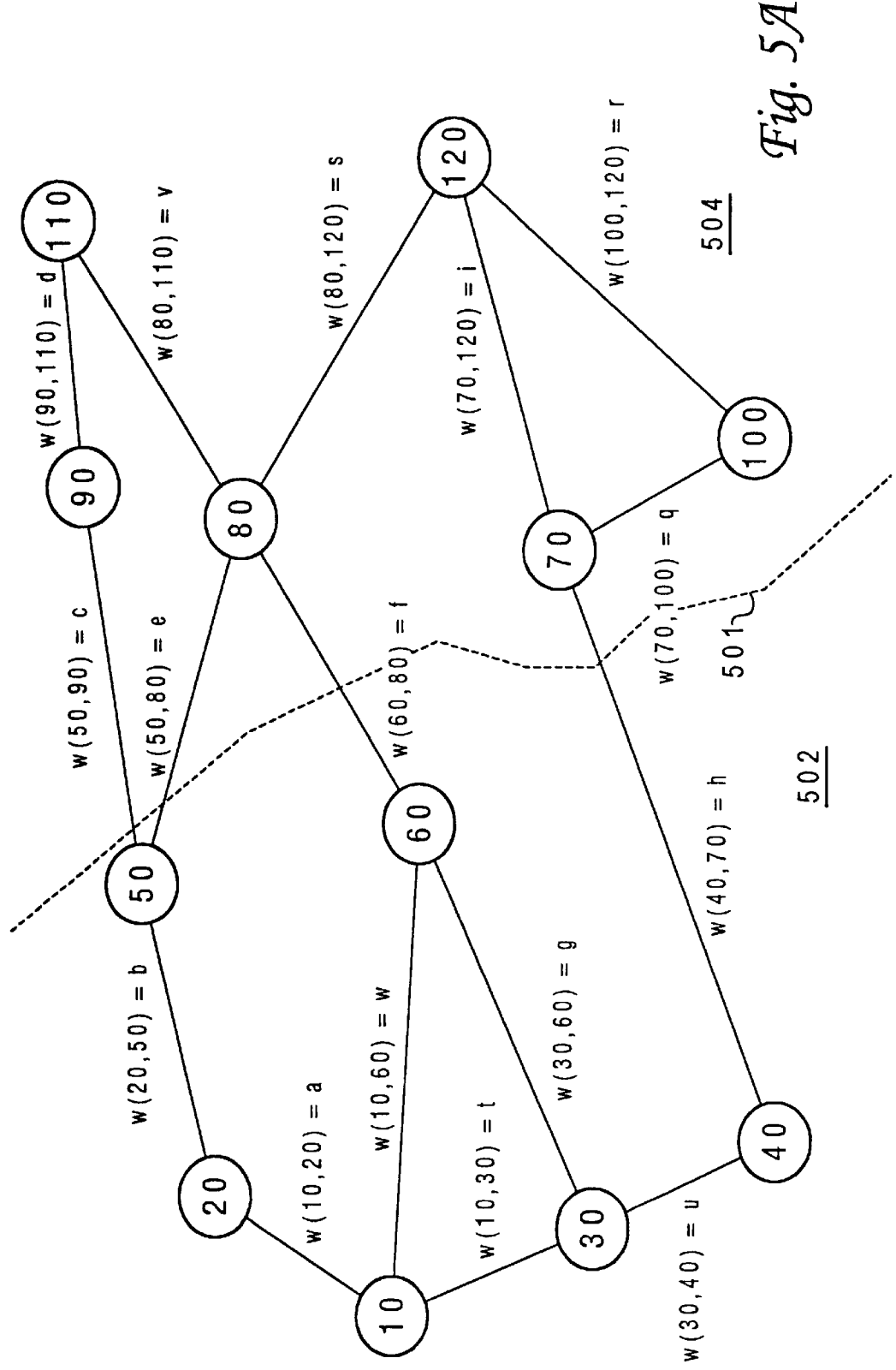
FIG. 5A pictorially illustrates the method utilized to solve the frequency assignment problem.
Figure 5B:
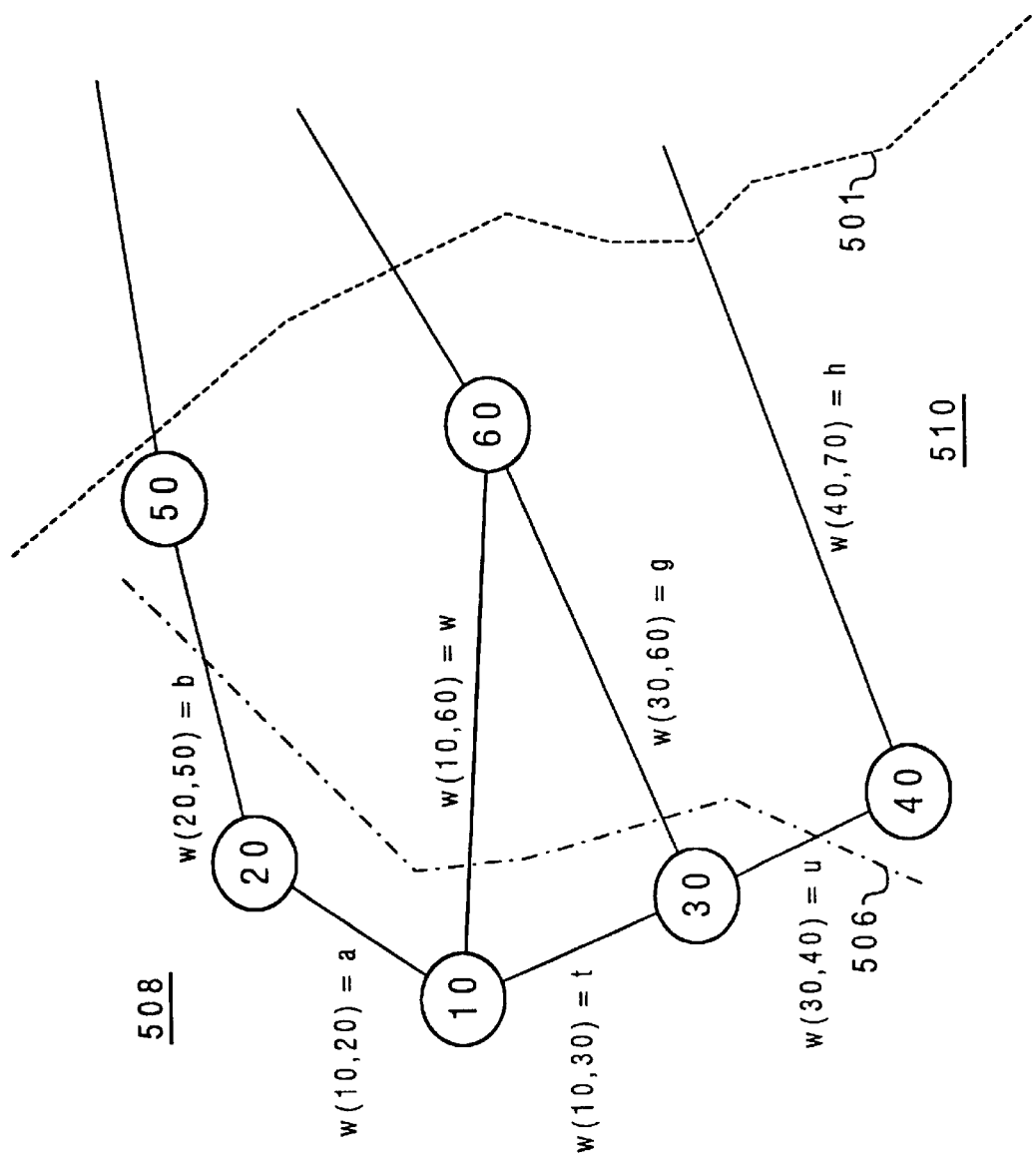
FIG. 5B illustrates first island 502 in isolation with a second partition 506 which is the result of subjecting first island 502 to the partitioning method.

FIG. 5A pictorially illustrates the method utilized to solve the frequency assignment problem. Shown is a network 500. A first partition 502 is shown which is the resultant partition that arises from subjecting the network to the partitioning method just described. As is shown, this first partition results in a "first island" 502 and a "second island" 504. It is assumed that first island 502 is selected and found to be too large to solve. Consequently, in FIG. 5B first island 502 is shown in isolation with a second partition 506 which is the result of subjecting first island 502 to the partitioning method just described. This second partition 506 results in first sub-island 508 and second sub-island 510.

At this point, sub-island 510 is examined and found to be solvable. Consequently, the sectors denoted by their centroid-like points in the graph are assigned frequency groups such that interference between sectors in sub-island 510 is minimized and communications efficiency maximized. After the frequency groups have been assigned to all of the sectors within sub-island 510, "bridges" are conceived between sub-island 510 and sub-island 508, in that one or more centroid-like points (sector) are chosen in sub-island 508 which are spanned by the arcs crossed by partition 506 (e.g., point 30 in the graph which is spanned by the arc (w(30,60)) connecting graph point 30 in sub-island 508 and point 60 in sub-island 510; point 10 in the graph which is spanned by the arc (w(10,60)) connecting graph point 10 in sub-island 508 and point 60 in sub-island 510; and point 20 in the graph which is spanned by the arc (W(20,50)) connecting graph point 20 in sub-island 508 and point 50 in sub-island 510) and a frequency group is optimally assigned to such selected sectors within sub-island 508 taking into account the frequency groups previously assigned to the such selected sectors and to the sectors in sub-island 510.

Thereafter, sub-island 508 is examined and determined if it is of a solvable size. If it is not it is partitioned into sub-problems in the fashion that has been described previously. However, for sake of illustration it will be assumed that it is solvable.

At this point, the sectors within first sub-island 508 are assigned frequency groups, taken into account the frequency group that has previously been assigned to the sector within sub-island 508; otherwise; the frequency groups are assigned as if sub-island 508 existed in isolation.

Subsequent to sub-island 508 being assigned frequency groups, it can be seen that first island 502 has been completely solve since sub-island 508 and sub-island 510, when taken together, completely compose first island 502. Thus, after the frequency groups have been assigned to all sectors within first island 502, "bridges" are conceived between first island 502 and second island 504, in that a point one or more points are chosen in second island 504 which is spanned by one of the arcs crossed by partition 501 (e.g., point 80 in the graph which is spanned by the arcs (w(50,90), and w(60,90)) connecting graph points 50 and 60 in sub-island 502 and point 80 in sub-island 504; point 90 in the graph which is spanned by the arc (w(50,90)) connecting graph point 50 in sub-island 502 and point 90 in sub-island 504; and point 70 in the graph which is spanned by the arc (W(40,70)) connecting graph point 40 in sub-island 502 and point 70 in sub-island 504) and a frequency assigned to that selected sector within island 504, taking into account the frequency groups previously assigned to the sectors in island 502.

Figure 5C:
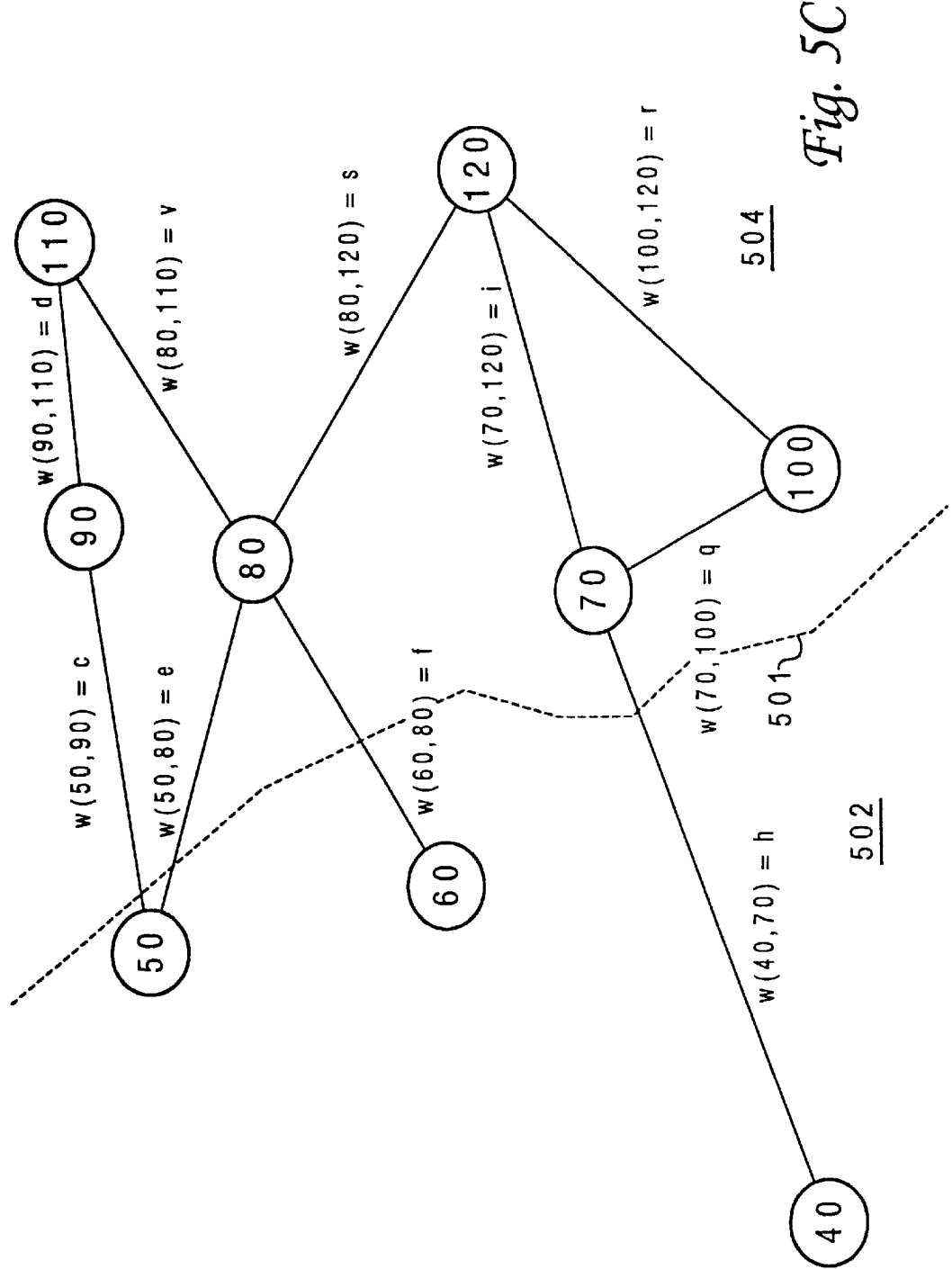
FIG. 5C illustrates island 504 in isolation.

Thereafter, island 504 is examined and determined if it is of a solvable size. FIG. 5C shows island 504 in isolation. If it is determined that island 504 is not of solvable size, it is partitioned into sub-problems in the fashion that has been described previously. However, for sake of illustration it will be assumed that it is solvable.

At this point, the sectors within second island 504 are assigned frequency groups, taking into account the frequency group that has previously been assigned to the selected sector within second island 504 (e.g., the sector associated with centroid-like point 80); otherwise, the frequency groups are assigned as if second island 504 existed in isolation (that is, other than taking into account the frequency group assigned to the sector associated with centroid-like point 80, previous frequency group assignments are ignored).

Subsequent to island 504 frequency group assignments being completed, it can be seen that frequency groups have been assigned over the entire network in the optimum fashion.

Those skilled in the art will recognize that the operations described in relation to FIG. 5 are uniquely suited to the utilization of recursion.

FIG. 6 is a high-level logic flowchart that illustrates a recursive method by which the foregoing operations described in relation to FIG. 5 can be achieved. Method step 600 depicts the start of the process. Method step 602 illustrates the determination of whether the portion of the network currently under active consideration is of solvable size (those skilled in the art will appreciate that there are many criteria which could be used to make this assessment, but one that has been found to be particularly useful has been to determine that a portion of a network is only solvable if the number of nodes to be solved lies below some upper limit). If it is determined that the portion of the network currently under active consideration is of solvable size, then the process proceeds to method step 604 which depicts that sectors within the network are optimally assigned frequency groups. Thereafter, the process proceeds to method step 606 and stops.

If it is determined in the inquiry depicted in method step 602 that the portion of the network currently under active consideration is not of solvable size, then the process proceeds to method step 608, wherein it is depicted that the portion of the network currently under active consideration is partitioned into a first and a second piece via the partitioning method discussed above. Thereafter, the first piece of the network under consideration is selected to be the portion of the network currently under active consideration and the process recursively returns to method step 602, which illustrates the determination of whether the portion of the network currently under active consideration is of solvable size (those skilled in the art will appreciate that there are many criteria which could be used to make this assessment, but one that has been found to be particularly useful has been to determine that a portion of a network is only solvable if the number of nodes to be solved lies below some upper limit). If it is determined that the portion of the network currently under active consideration is of solvable size, then the process proceeds to method step 604 which depicts that sectors within the network are optimally assigned frequency groups. Thereafter, the process proceeds to method step 606 and stops.

If it is determined in the inquiry depicted in method step 602 that the piece of the network under consideration (i.e., the piece whose selection was depicted in method step 610) is of solvable size, then the process proceeds to method step 604, wherein it is depicted that frequency groups are assigned to the sectors in the piece of the network currently under active consideration. Thereafter, the process proceeds to method step 606 which illustrates that the current recursive process is terminated. Thereafter, the process "kicks back" or "backs out" to method step 610 (at this point, the frequency groups have been assigned to the sectors in the piece of the network selected as was depicted in method step 610) and subsequently proceeds to method step 611, which depicts the solution of a "bridge problem" ("bridge problem" is a term that means that the first piece and second piece, created by the most recent execution of the partitioning operation shown in method step 608, are treated as "islands" and that it is conceived that a communications "bridge" is built between them; this operation was discussed previously, above, wherein it was disclosed that after frequencies have been assigned to one "island," adjacent sectors are chosen in the second "island" and frequencies assigned to them taking into account the frequency assignments given to the first island).

Subsequent to the solution of the bridge problem (i.e., frequencies assigned to adjacent sectors in the second piece of the portion of the network currently under active consideration) for the most current two pieces produced by the partitioning operation depicted in method step 608, the process proceeds to method step 612, which depicts that the second piece of the network resulting from the most recent partitioning step is selected and that thereafter the process proceeds to method step 602. If the inquiry depicted in method step 602 indicates the piece of the network currently under active consideration is of solvable size, then the sequence of events subsequent to method step 602 then proceeds as has been discussed previously.

In the event that any inquiry depicted in method step 602 results in a determination that any piece of the network is not of solvable size then the process proceeds to method step 608 wherein the piece of the network currently under active consideration is partitioned into two pieces; in other words, the piece of the network currently under active consideration is further subdivided into two pieces, resulting in two "subproblems" (or sub-islands) to be solved. Thereafter, the process proceeds related to the two resultant "subproblems" (or sub-island) as has been described above, until each "subproblem" (or sub-island) is completely solved (i.e., the first piece, or "island" of the most current subproblem is solved, then the "bridge problem" between the first and second piece of the most current subproblem is solved, and then the second piece, or "island" of the most current subproblem is solved); thereafter, the process backs out to the point where the most recent subproblem was created and proceeds to solve the subproblem at the next "higher level" in the recursive call structure. The foregoing process of recursively dividing the network into smaller solvable problems, solving the smaller solvable problems, and then backing out and proceeding to solve the problems at the next higher level in the recursive call structure continues until every single region of the network has been assigned a frequency group. Those skilled in the art will understand that such recursive call structures could indeed go very deep, and could result not only in sub-problems, but also in sub-sub-problems, sub-sub-sub problems, etc.

Every single region will be assigned a frequency group when (assuming that the first pass through the network divided it into at least two original pieces) the second piece resulting from the first partitioning of the network is solved (i.e., all sectors within that second piece have been assigned a frequency group). In FIG. 6, this will occur at method step 612. Once the second piece of the original partitioning of the network has been completely solved (the solution of which may itself have required several recursive passes, and thus the solution of possibly several subproblems, through the flowchart depicted in FIG. 6, in the manner discussed above) it is known that the entire network has solved (that is, all sectors have been assigned frequency groups), and the process thereafter proceeds to method step 614 and stops.

It has been mentioned repeated times in discussing FIG. 6 that sectors are assigned their optimal frequency groups at various points throughout the flowchart. Those skilled in the art will recognize that there are many methods by which such can be done, such as the well-known graph-coloring algorithm and its various derivatives. As an addition to these foregoing well-known methods, FIG. 7 depicts a newly-created set of criteria to be utilized with a newly-created method whereby a frequency group can be optimally assigned to a sector under consideration. When any resulting problem (island), or subproblem (sub-island), under consideration is "small" enough (one example of which being that the number of nodes involved falls below a certain threshold, as was discussed above), the newly created technique of FIG. 7 can be utilized to solve the subproblem under consideration.

Referring to the set of criteria depicted in FIG. 7, let $x_i$ be a frequency group number (that is, it is assumed that each group has been assigned a group number analogous to the way that group numbers are depicted as being assigned to particular groups of channels in the fashion depicted in FIG.

8). Let k by the set of testing points (that is, the set of centroid-like points that have been associated with each sector as has been discussed above), and at each point k, $J_k$ be the set of sectors where potential interference comes from (i.e., the set of sectors whose received signal strengths at point k falls above some one or more predefined criteria). Also, let $i_k$ be representative of the sector giving the best received signal strength at point k (e.g., the BEST_CHN column in FIG. 4 associated with sector/centroid-like point k). Utilizing such definitions the criteria can be utilized to solve the group frequency assignment problem.

The objective in assigning frequency groups is to do such an assignment such that the communications efficiency is optimized across the problem under consideration. Communications efficiency in assigning a frequency group to each sector/centroid-like point is defined be the assignment which minimizes the interference at that particular point. Consequently, as is shown in FIG. 7, the objective is to minimize Z, where Z stands for the maximum interference to signal strength ratio among all the drive test points.

Consequently, Z is referred to as the "objective function" meaning that the "object" (or desired task) of the criteria presented is to minimize Z; thus, minimization of Z can be understood as assigning a frequency group from a pool of available frequency groups such that the assignment minimizes the maximum likely interference to be experience when utilizing a transmitter associated with a sector/centroid-like point $i_k$ to communicate with an entity within the sector associated with a centroid-like point k.

The signal to noise ratio can be represented as $P_{kik}$, which is analogous to the signal strength power received by a receiver in sector k from the transmitter in sector i (e.g., the BEST_CHN as discussed in relation to FIG. 4), divided by $\Sigma Z_{kj}$, where the summation is taken over all j which are members of $J_k$ (received signals in the sector associated with centroid-like point k strong enough to constitute interference) which is analogous to the sum of the received signal strengths, judged to be of sufficient power to constitute interference (i.e., such received signals are above some system administrator chosen threshold which constitutes the minimum received power at which a signal can practically be thought of as interference) at point k from transmitters associated with transmitter other than that transmitter associated with sector i. Accordingly, the interference to signal ratio, which can be thought of as the maximum received signal strength at a point k, can be understood as the inverse of the signal-to-noise ratio, which is why Z is defined in criterion 700 to be $\Sigma Z_{kj}$, where the summation is taken over all j which are members of $J_k$) over a divided by $P_{kik}$. Further definition of Z is also shown in criterion 710 that the ordinal number assigned to groups of frequencies (as is shown in FIG. 8) are defined to always be 0 or greater (i.e, $0 \leq X_{ik}$ as shown in criterion 710); furthermore, the ordinal number assigned to a channel defined such that it is always less than the total number of channels present (i.e., $X_j \leq N-1$, where N refers to number of groups present, and 1 is subtracted because ordinal numbering of the channels is assumed to start with zero as shown in criterion 710). Lastly, Z is defined such that it is always non-negative (i.e., $Z \geq 0$ as shown in criterion 710).

Utilizing the definition of Z just set forth, a channel group is then assigned to any sector/centroid-like point k under consideration on the basis of the optimum assignment regarding the remaining criteria shown in the chart. The remaining criteria shown is criterion 702, $Z_{kj} \geq P_{kj} - |X_{ik} - X_j| \times d_{kj}$ where $j \in J_k$, $k \in K$, which can be interpreted to mean that the interference power at some point k due to a transmitter in some sector/centroid like point j is greater than or equal to the power of the transmitter at j, as received at point k, minus the product of the power decrement in milliwatts if the interference is from the adjacent channel (defined as $d_{kj} = P_{kj} \times (1 - 10^{-m/10})$ where m is the next channel mask, which is typically set to equal 25 dB for a TDMA network, or 18 dB for a GSM network; that is, the signal level spilled over from an adjacent channel is 25 dB less than its original power) times the absolute value of the difference of the group number of the frequency group assigned to point i and the group number assigned to the sector/centroid-like point j.

The two criteria 704 and 706 essentially amount to "correction factors." The correction factors correct the fact that although the frequencies in the Nth channel group are typically only separated by one frequency (e.g., when $X_{ik}$ is N and $X_j$ is 0 which is corrected by criteria 704), and thus have fairly significant likelihood of interference, the foregoing interference criterion 702 would seem indicate that only small interference was likely. Thus, the quantity $(N - X_{ij} + X) \times dk$ where $j \in J_k$, $k \in K$, in criterion 704, corrects for the foregoing, and similar, misrepresentations with respect to interference. Likewise for criterion 706. The quantity $(N + X_{ik} - X_j) \times dk$ where $j \in J_k$, $k \in K$, in criterion 706, corrects for the converse situation; that is, as the most extreme example, accurately capturing the adjacent channel effects that occur when $X_{ik}$ is 0 and $X_j$ is N.

Criterion 708 is the "objective function" Z rewritten for easy computation.

Lastly, criterion 710, $|X_{ik} - X_j| \geq c$ if i, j are adjacent sectors, is a control factor which ensures that any frequency group assignments are such that adjacent sectors will have frequency groups assigned to them that are separated by at least some predefined channel separation requirement, c.

It will be understood by those within the art that the above formulation is an integer programming problem since each $X_j$ is defined to be an integer.

It should be noted that the above formulation has the following assumptions:

(1) that the frequencies are assigned in groups;
(2) group i is only adjacent to group i−1 and group i+1. Group 0 is adjacent to group N and group 1. Group N is adjacent group N−1 and 0.

Lastly, it should be noted that if it is desired to assign multiple groups to the same sector, extra constraints $|X_{i1} - X_{i2}| \geq d$, where d is a predefined channel separation requirement for channels assigned to the same sector.

Also, as an alternative to the above, the objective function Z can be replaced by $MZ + m \Sigma X_j$, where $X_j$ is summed over j, and where M is a large number such as 10000, and where m is a relatively much smaller number like 0.0001. The advantage of this formulation is that it will first minimize the interference to signal level in the network such that MZ is the dominating factor in the function. But if there are multiple optimal solutions existing that minimize the signal to interference level in the network then the second term will force the method to choose the solution that uses the least amount of frequency groups, and thus leave more frequencies available for other subproblems, and hence potential increase the quality of the final solution.

FIG. 8 sets forth a table where the foregoing described assumptions related to the numbering of frequency groups are illustrated, and where the first channel group is denoted channel group 0 and the last channel group is denoted 20. Thus, there are 21 channel groups with the first group being numbered 0 and the last group being numbered 20 (e.g., N−1). It will be understood by those within the art that N is typically 21 for a TDMA system and either 12 or 9 for a GSM system.

In the above description, an assumption was made that the frequencies would be assigned in groups to each sector. Those skilled in the art will recognize that, in reality, the number of frequencies required at each sector is usually determined by the traffic load in each sector. Because of this, it is envisioned that there will be times when each sector would not be assigned a full frequency group; rather, in such situations, one or more sectors will be assigned subsets of the defined frequency groups.

The assignment of the subsets of the defined frequency groups can be accomplished by an extension of the foregoing discussion. Two exemplary ways in which this could be done will now be set forth.

Figure 9:
FIG. 9 depicts an example of an assignment to minimize overlap, where a group "j" is split among a sector "m," which only requires 5 frequencies, and a sector "n" which only requires 6 frequencies.

One way in which assigning subsets can be accomplished is via the following. First, define a number of channel groups necessary for each sector based upon each such sector's network traffic; that is, for any specific sector "i" not needing every frequency contained in group "j," define a ceiling for the number of group necessary for that sector by using the equation g(i)=ceiling (f(i)/M) where f(i) is the number of frequencies, as determined by sector "i'"s network traffic, required by sector "i" and M is the number of frequencies in each group (so, if we assign at least g(i) frequency groups to sector "i," we will satisfy the communication demands of sector "i," which is why g(i) is referred to as a "ceiling"). Second, solve the frequency assignment problem for either all or part of a network is achieved as has been described above by assigning g(i) number of frequency groups to each sector. Third, after the frequency assignment problem has been solved for either all or part of the entire network (whether all or part of the network is to be solved is an option for the system administrator to choose), the traffic load information for each sector is utilized to determine which sectors do not need to have entire set of frequencies within each g(i) number of frequency groups assigned to them. Fourth, for each existing frequency group (e.g., groups 0–20 in FIG. 8), denoted here simply as "j," (meaning a specific one of the existing frequency groups) select from the network those sectors which have been previously assigned the frequency group "j." Fifth, from such selected sectors, utilize the traffic load information for each sector in order to determine which of the selected sectors do not the need entire set of frequencies in from their assigned frequency group "j." Sixth, choose a pair of sectors not requiring the entire set of frequencies in their assigned frequency group "j" that have maximum likelihood of interfering with each other among all pairs (e.g., a pair of sectors that are "closest" to each other in a communications sense, in that if the same frequency were used in each sector in the pair it the greatest likelihood of interference would exist between the sectors in the pair chosen; alternatively, the pair of sectors could be chosen as those geographically closest to each other as a heuristic solution), and which have not had specific frequencies assigned to such chosen sectors. Seventh, assign individual frequencies from group "j" to each of the chosen sectors to minimize the overlap of the frequencies between those two sectors (FIG. 9 depicts an example of such an assignment to minimize overlap, where group "j" is split among sector "m," which only requires 5 frequencies, and sector "n" which only requires 6 frequencies). Eighth, loop through the remaining sectors assigned frequency group "j," but which do not need every single frequency in group "j."

Thereafter, choose another frequency group, denoted by "k," which has not been subjected to the foregoing process for assigning a fraction of frequency groups to sectors, and engage in the foregoing described process for assigning partial frequency groups. Continue to loop through the foregoing until all the sectors in the network have been subjected to the foregoing process.

A second way in which partial assignment could be achieved would be to regard each individual frequency as a group and apply the above described method for assigning complete groups of frequencies to each sector "as if" each individual frequency were a "group." For example, instead of utilizing the 21 frequency groups as shown, if there are in total 300 individual group frequencies, the problem can be formulated utilizing 300 frequency "groups," and then assigning each such group utilizing the standard approach, as set forth above.

Figure 10:
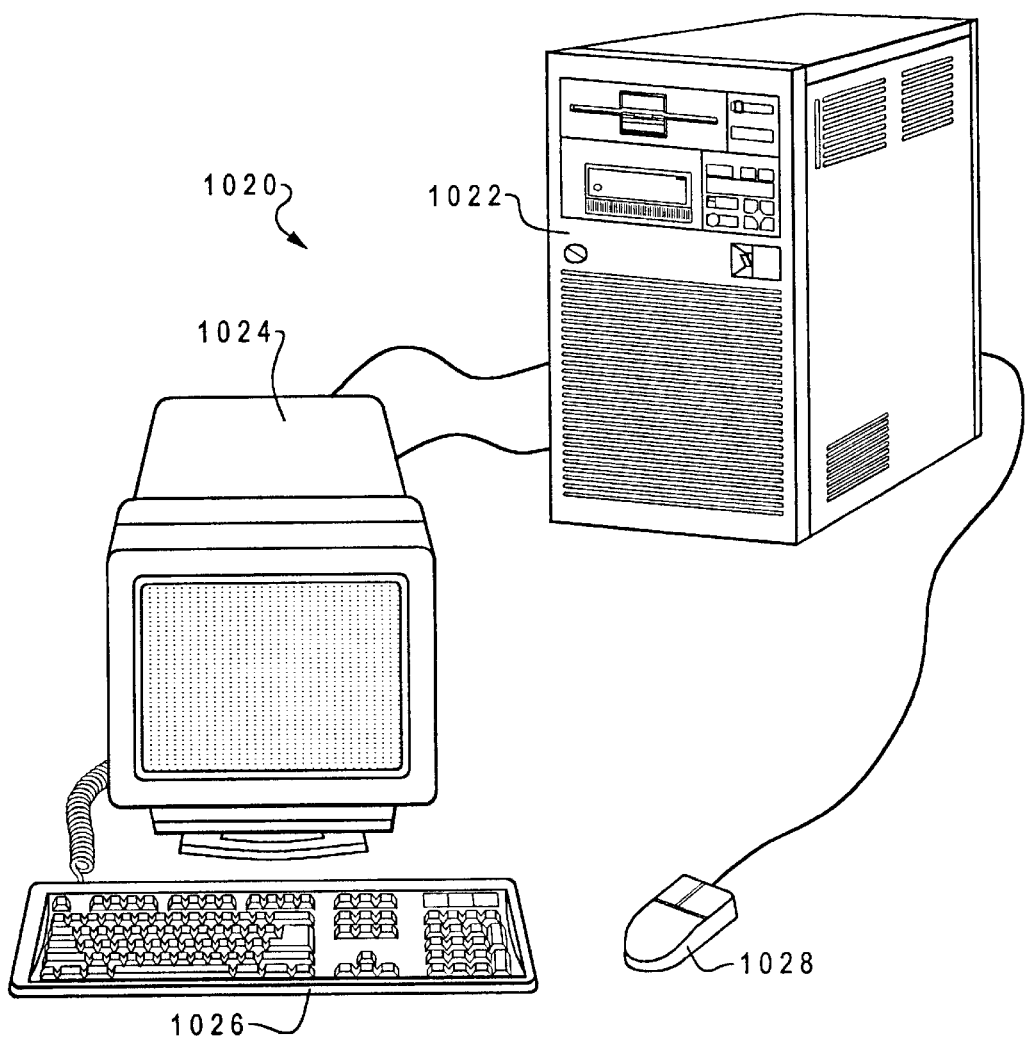
FIG. 10 depicts a pictorial representation of a data-processing system which can be utilized in accordance with the method an system of an illustrative embodiment of the present invention.

With reference now to the figures and in particular with reference now to FIG. 10, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 10. A computer 1020 is depicted which includes a system unit 1022, a video display terminal 1024, a keyboard 1026, and a mouse 1028. Computer 1020 may be implemented utilizing any suitably powerful computer, such as commercially available mainframe computers, minicomputers, or microcomputers.

Figure 11:
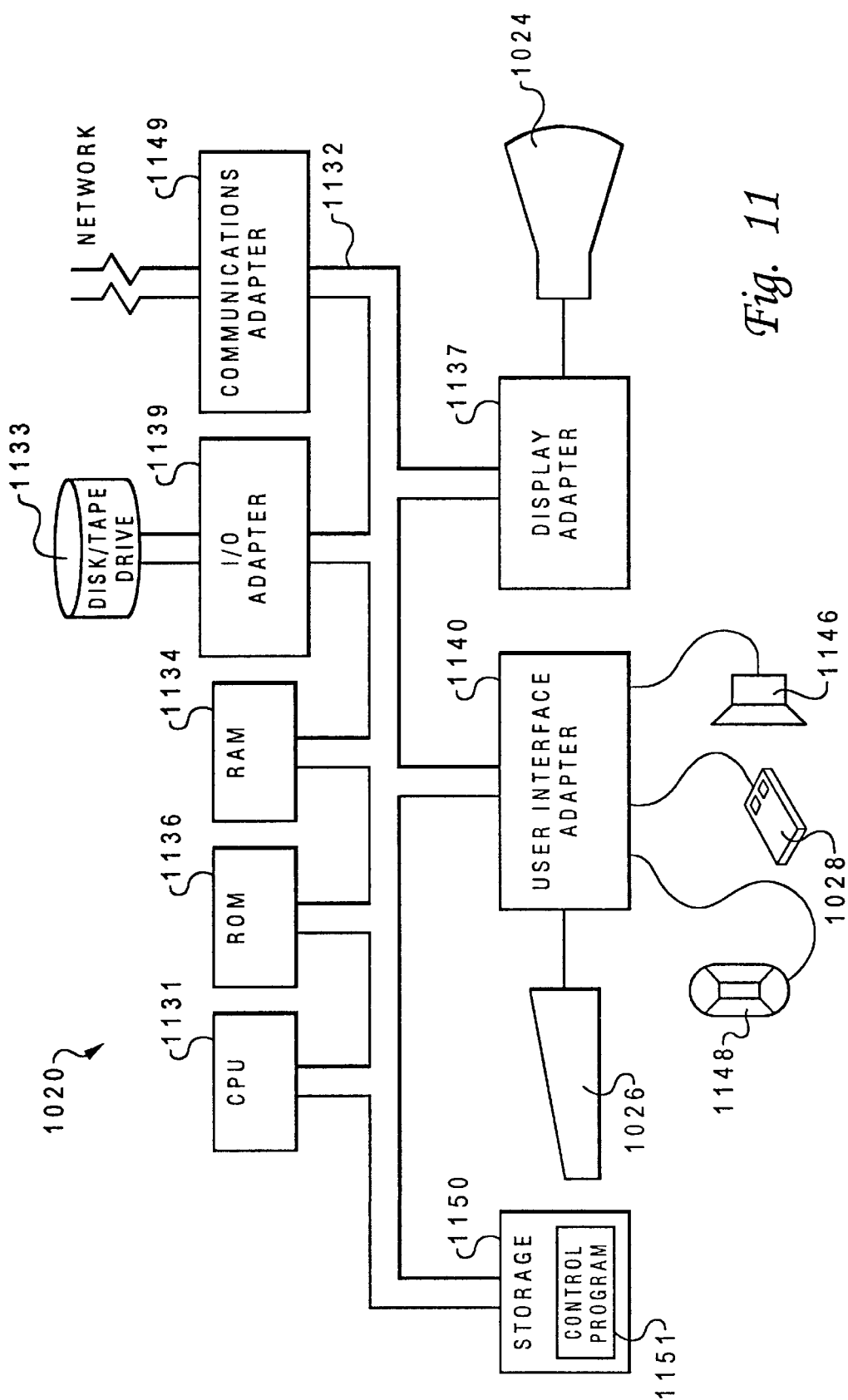
FIG. 11 is an illustration of a representative hardware environment which can be utilized in accordance with the method and system of an illustrative embodiment of the present invention.

FIG. 11 is an illustration of a representative hardware environment which can be utilized in accordance with the method and system of an illustrative embodiment of the present invention. FIG. 11 depicts selected components in computer 1020 in which an illustrative embodiment of the present invention may be implemented. System unit 1022 includes a Central Processing Unit ("CPU") 1131, such as a conventional microprocessor, and a number of other units interconnected via system bus 1132. Computer 1120 includes random-access memory ("RAM") 1134, read-only memory ("ROM") 1136, display adapter 1137 for connecting system bus 1132 to video display terminal 1024, and I/O adapter 1139 for connecting peripheral devices (e.g., disk and tape drives 1133) to system bus 1132. Video display terminal 1024 is the visual output of computer 1120, which can be a CRT-based video display well-known in the art of computer hardware. However, with a portable or notebook-based computer, video display terminal 1024 can be replaced with an LCD-based or a gas plasma-based flat-panel display. Computer 1020 further includes user interface adapter 1140 for connecting keyboard 1026, mouse 1028, speaker 1146, microphone 1148, and/or other user interface devices, such as a touch screen device (not shown), to system bus 1132. Communications adapter 1149 connects computer 1020 to a data-processing network.

Any suitable machine-readable media may retain the method and system of an illustrative embodiment of the present invention, such as RAM 1134, ROM 1136, a magnetic diskette, magnetic tape, or optical disk (the last three being located in disk and tape drives 1133). Any suitable operating system and associated graphical user interface (e.g., Microsoft Windows) may direct CPU 1131. For example, the AIX operating system and AIXwindows windowing system (i.e., graphical user interface) can direct CPU 1131. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 1131, such as touch-screen technology or human voice control. In addition, computer 1020 includes a control program 1151 which resides within computer storage 1150. Control program 1151 contains instructions that when executed on CPU 1131 carries out any or all of the operations depicted in the logic flowcharts of FIG. 6 and the partially schematic diagrams of FIGS. 3, 4, 5A, 5B, 5C, 6, 7, 8 and 9, as described herein, necessary to implement the embodiments.

Those skilled in the art will appreciate that the hardware depicted in FIG. 11 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for use with wireless communications systems having a cellular architecture covering a defined geographic area, and wherein said geographic area is populated by a plurality of cells and wherein each of said plurality of cells is subdivided into sectors, and wherein said wireless communications system has a plurality of groups of channels, and wherein said method assigns specific groups of channels drawn from said plurality of groups of channels to each sector such that signal to noise ratio over said geographic area is optimized, said method comprising the steps of:

determining one or more pairs of said sectors within said defined geographic area wherein a weak connection zone exists;

in response to said determining step, decomposing said defined geographic area into two or more sub-areas composed of one or more of said sectors and wherein each sub-area is isolated from other sub-areas by said determined one or more pairs of sectors having a weak connection zone;

determining whether a first of said sub-areas is of solvable size, wherein if said first of said sub-areas is not of solvable size, defining a geographic area equal to said first of said sub-areas, and thereafter recursively engaging in said decomposing step and subsequent steps to yield a solvable sub-area;

assigning frequency groups to each sector within a selected first sub-area of said solvable sub-area such that signal to noise ratio is optimized across said selected first sub-area;

thereafter, assigning a frequency group or groups to a selected one or more sectors within a selected second of said solvable sub-areas which are linked to one or more sectors within said selected first sub-area such that signal to noise ratios in said selected one or more sectors within said selected second of said solvable sub-areas is optimized; and thereafter, assigning frequency groups to every other sector within said selected second of said solvable sub-areas such that signal to noise ratio is optimized across said selected second of said solvable sub-areas such that signal to noise ratio over said defined geographic area is optimized.

2. The method of claim 1, wherein said step of thereafter assigning frequency groups to every other sector within said selected second of said sub-areas further comprises the steps of:

determining whether said selected second of said sub-areas is of solvable size;

in response to a determination that said selected second of said sub-areas is not of solvable size, defining a geographic area equal to said selected second of said sub-areas; and with said geographic area so defined, thereafter recursively engaging in said decomposing step and subsequent steps.

3. The method of claim 1, comprising the steps of:

determining a number of frequencies required by each sector;

selecting a specific frequency group;

determining which sectors have been assigned said selected specific frequency group;

creating a sub-set of said determined sectors whose said determined number of frequencies required is less than all of the available frequencies in said selected specific frequency group;

selectively removing two sectors in said created sub-set which have a maximum likelihood of interference;

assigning frequencies to said selected sectors from said selected specific frequency group such that likelihood of interference between the selected sectors is minimized; and thereafter repeating said selectively removing two sectors and said assigning frequencies steps until said sub-set is empty or has only one remaining member.

4. The method claim 3 wherein said step of determining a number of frequencies required by each sector comprises the steps of:

obtaining network traffic information for one or more sectors; and in response to said obtaining step, determining the number of frequencies necessary to carry expected network traffic in said one or more sectors.

5. The method of claim 1 further comprising the step of treating each individual frequency as if it were in fact a frequency group such that each individual frequency is treated and thus subsequently assigned as if it were a group.

6. A system for use with wireless communications systems having a cellular architecture covering a defined geographic area, and wherein said geographic area is populated by a plurality of cells and wherein each of said plurality of cells is subdivided into sectors, and wherein said wireless communications system has a plurality of groups of channels, and wherein said system assigns specific groups of channels drawn from said plurality of groups of channels to each sector such that signal to noise ratio over said geographic area is optimized, said system comprising the steps of:

means for determining one or more pairs of said sectors within said defined geographic area wherein a weak connection zone exists;

means responsive to said means for determining, for decomposing said defined geographic area into two or more sub-areas composed of one or more of said sectors and wherein each sub-area is isolated from other sub-areas by said determined one or more pairs of sectors having a weak connection zone;

means for determining whether a first of said sub-areas is of solvable size, wherein if said first of said sub-areas is not of solvable size, for defining a geographic area equal to said first of said sub-areas, and thereafter recursively engaging in said decomposing step and subsequent steps to yield a solvable sub-area;

means for assigning frequency groups to each sector within a selected first sub-area of said solvable sub-area such that signal to noise ratio is optimized across said selected first sub-area;

means for thereafter assigning a frequency group or groups to a selected one or more sectors within a selected second of said solvable sub-areas which are linked to one or more sectors within said selected first sub-area such that signal to noise ratios in said selected one or more sectors within said selected second of said solvable sub-areas is optimized; and means for thereafter assigning frequency groups to every other sector within said selected second of said solvable sub-areas such that signal to noise ratio is optimized across said selected second of said solvable sub-areas such that signal to noise ratio over said defined geographic area is optimized.

7. The system of claim 6, wherein said means for thereafter assigning frequency groups to every other sector within said selected second of said sub-areas further comprises:

means for determining whether said selected second of said sub-areas is of solvable size;

means responsive to a determination that said selected second of said sub-areas is not of solvable size, for defining a geographic area equal to said selected second of said sub-areas; and with said geographic area so defined, means for thereafter recursively engaging in said decomposing step and subsequent steps.

8. The system of claim 6, comprising:

means for determining a number of frequencies required by each sector;

means for selecting a specific frequency group;

means for determining which sectors have been assigned said selected specific frequency group;

means for creating a sub-set of said determined sectors whose said determined number of frequencies required is less than all of the available frequencies in said selected specific frequency group;

means for selectively removing two sectors in said created sub-set which have a maximum likelihood of interference;

means for assigning frequencies to said selected sectors from said selected specific frequency group such that likelihood of interference between the selected sectors is minimized; and means for thereafter repeating said selectively removing two sectors and said assigning frequencies steps until said sub-set is empty or has only one remaining member.

9. The system of claim 8 wherein said means for determining a number of frequencies required by each sector comprises:

means for obtaining network traffic information for one or more sectors; and means responsive to said obtaining step, for determining the number of frequencies necessary to carry expected network traffic in said one or more sectors.

10. The system of claim 6 further comprising means for treating each individual frequency as if it were in fact a frequency group such that each individual frequency is treated and thus subsequently assigned as if it were a group.

11. A method for use in a wireless communications system having a cellular architecture covering a defined geographic area, and wherein said defined geographic area is populated by a plurality of cells and wherein each of said plurality of cells is subdivided into sectors, and wherein said wireless communications system has a plurality of groups of channels, and wherein said method assigns a specific group of channels, drawn from said plurality of groups of channels, to a particular one of said sectors such that the signal to noise ratio within said particular one is optimized is optimized, said method comprising the steps of:

assigning to said particular one of said sectors a group, drawn from said plurality of groups of channels, of available channels;

determining an aggregate interference in said particular one of said sectors arising from active groups of channels other than said group assigned to said particular one of said sectors, wherein aggregate interference is determined by summing one or more received signal strengths on frequencies other than those frequencies assigned to said particular one of said sectors;

calculating a signal to noise ratio drawn upon a signal strength of said group of channels assigned to said particular one of said sectors and said determined aggregate interference;

thereafter repeating said assigning, determining, and calculating steps until all available groups of channels have been assigned to said particular one of said sectors and said determining and calculating steps have been engaged in for all said available groups; and selecting for permanent assignment to said particular one of said sectors that group having the best calculated signal to noise ratio.

12. A system for use in a wireless communications system having a cellular architecture covering a defined geographic area, and wherein said defined geographic area is populated by a plurality of cells and wherein each of said plurality of cells is subdivided into sectors, and wherein said wireless communications system has a plurality of groups of channels, and wherein said system assigns a specific group of channels, drawn from said plurality of groups of channels, to a particular one of said sectors such that the signal to noise ratio within said particular one is optimized is optimized, said system comprising:

means for assigning to said particular one of said sectors a group, drawn from said plurality of groups of channels, of available channels;

means for determining an aggregate interference in said particular one of said sectors arising from active groups of channels other than said group assigned to said particular one of said sectors, wherein aggregate interference is calculated as a sum of one or more received signal strengths on frequencies other than those frequencies assigned to said particular one of said sectors;

means for calculating a signal to noise ratio drawn upon a signal strength of said group of channels assigned to said particular one of said sectors and said determined aggregate interference;

means for thereafter repeating said assigning, determining, and calculating steps until all available groups of channels have been assigned to said particular one of said sectors and said determining and calculating steps have been engaged in for all said available groups; and means for selecting for permanent assignment to said particular one of said sectors that group having the best calculated signal to noise ratio.

* * * * *